United States Patent
Hsieh et al.

(10) Patent No.: US 10,063,873 B2
(45) Date of Patent: *Aug. 28, 2018

(54) METHOD FOR ADAPTIVELY PERFORMING VIDEO DECODING, AND ASSOCIATED ADAPTIVE COMPLEXITY VIDEO DECODER AND ADAPTIVE AUDIO/VIDEO PLAYBACK SYSTEM

(71) Applicant: MEDIATEK INC., Hsin-Chu (TW)

(72) Inventors: Fang-Yi Hsieh, Taipei (TW);
Jian-Liang Lin, Yilan County (TW)

(73) Assignee: MEDIATEK INC., Hsin-Chu (TW)

( * ) Notice: Subject to any disclaimer, the term of this patent is extended or adjusted under 35 U.S.C. 154(b) by 238 days.

This patent is subject to a terminal disclaimer.

(21) Appl. No.: 14/856,558

(22) Filed: Sep. 17, 2015

(65) Prior Publication Data
US 2016/0007036 A1 Jan. 7, 2016

Related U.S. Application Data

(63) Continuation-in-part of application No. 12/830,419, filed on Jul. 5, 2010, now Pat. No. 9,172,980, which
(Continued)

(51) Int. Cl.
*H04N 7/12* (2006.01)
*H04N 19/44* (2014.01)
(Continued)

(52) U.S. Cl.
CPC ............ *H04N 19/44* (2014.11); *H04N 19/13* (2014.11); *H04N 19/132* (2014.11);
(Continued)

(58) Field of Classification Search
CPC ...... H04N 19/44; H04N 19/13; H04N 19/132; H04N 19/156; H04N 19/48; H04N 19/59; H04N 21/234363; H04N 21/43637
See application file for complete search history.

(56) References Cited

U.S. PATENT DOCUMENTS 5,801,975 A 9/1998 Thayer
6,064,676 A * 5/2000 Slattery ............ H04N 21/23608
370/412
(Continued)

FOREIGN PATENT DOCUMENTS

CN 1902939 A 1/2007
CN 101729883 A 6/2010
(Continued)

OTHER PUBLICATIONS

Hyeong-Min Nam et al:"A Complexity Scalable H.264 Decoder with Downsizing Capability for Mobile Devices", IEEE Transactions on Consumer Electronics, vol. 56, No. 2, 2010, pp. 1025-1033, XP011312771, IEEE Service Center, NY,US, May 2010.
(Continued)

*Primary Examiner* — Nhon Diep
(74) *Attorney, Agent, or Firm* — Winston Hsu

(57) ABSTRACT

A method for adaptively performing video decoding includes: performing decoding complexity management based upon parameter representing processing capability related to the adaptive complexity video decoder, in order to determine whether to reduce decoding complexity of at least one component of a plurality of components within an adaptive complexity video decoder; and selectively reducing decoding complexity of a portion of components within the adaptive complexity video decoder. An associated adaptive complexity video decoder and an associated adaptive audio/video playback system are also provided. In particular, the adaptive complexity video decoder includes a plurality of components and a decoding complexity manager. When needed, the decoding complexity manager delays audio playback of audio information.

14 Claims, 10 Drawing Sheets

Related U.S. Application Data is a continuation-in-part of application No. 12/732,177, filed on Mar. 25, 2010, now Pat. No. 9,259,808.

(51) Int. Cl.

| | | |
|---|---|---|
| *H04N 19/13* | (2014.01) | |
| *H04N 21/2343* | (2011.01) | |
| *H04N 21/4363* | (2011.01) | |
| *H04N 19/132* | (2014.01) | |
| *H04N 19/156* | (2014.01) | |
| *H04N 19/48* | (2014.01) | |
| *H04N 19/59* | (2014.01) | |

(52) U.S. Cl.
CPC ........... *H04N 19/156* (2014.11); *H04N 19/48* (2014.11); *H04N 19/59* (2014.11); *H04N 21/234363* (2013.01); *H04N 21/43637* (2013.01)

(56) References Cited

U.S. PATENT DOCUMENTS

| | | |
|---|---|---|
| 6,584,154 B1 | 6/2003 | Wu |
| 7,280,595 B1 | 10/2007 | Lin |
| 7,590,059 B2 | 9/2009 | Gordon |
| 7,630,569 B2 | 12/2009 | DeCegama |
| 8,139,647 B2 * | 3/2012 | Tokumo ............... H04N 19/176 375/240.12 |
| 8,446,946 B2 | 5/2013 | Chiang |
| 8,693,553 B2 * | 4/2014 | Vaquero ............. H04N 21/2368 375/240.28 |
| 2005/0240386 A1 | 10/2005 | Carballo |
| 2006/0233259 A1 | 10/2006 | Chou |
| 2007/0274384 A1 | 11/2007 | Schwarz |
| 2008/0007194 A1 * | 1/2008 | Mace ...................... H02P 1/04 318/625 |
| 2008/0089417 A1 | 4/2008 | Bao |
| 2009/0003447 A1 | 1/2009 | Christoffersen |
| 2010/0053352 A1 | 3/2010 | Dekel |
| 2010/0226437 A1 | 9/2010 | Robertson |

FOREIGN PATENT DOCUMENTS

| | | |
|---|---|---|
| EP | 1 655 966 A2 | 5/2006 |
| EP | 1 655 966 A3 | 4/2011 |
| JP | 2007221697 A | 8/2007 |
| TW | 201008286 | 2/2010 |
| WO | 02078353 A1 | 10/2002 |
| WO | 2008060262 A1 | 5/2008 |

OTHER PUBLICATIONS

Seong Hwan Cho et al:"A Low Power Variable Length Decoder for MPEG-2 Based on Nonuniform Fine-Grain Table Partitioning", IEEE Transactions on Very Large Scale Integration (VLSI) Systems, vol. 7, No. 2, Jun. 1999, pp. 249-256, XP000833596, IEEE Service Center, NJ,US.

Thomas Wiegand et al:"Overview of the H.264/AVC Video Coding Standard", IEEE Transactions on Circuits and Systems for Video Technology, vol. 13, No. 7, Jul. 2003, pp. 560-576, XP011099249, IEEE Service Center, NJ, US.

Yanmei Qu et al:"A Cost-effective VLD Architecture for MPEG-2 and AVS", Journal of Signal Processing Systems, vol. 52, No. 1, 2007, pp. 95-109, XP019616654, Boston, US, Oct. 2007.

* cited by examiner

METHOD FOR ADAPTIVELY PERFORMING VIDEO DECODING, AND ASSOCIATED ADAPTIVE COMPLEXITY VIDEO DECODER AND ADAPTIVE AUDIO/VIDEO PLAYBACK SYSTEM

CROSS REFERENCE TO RELATED APPLICATION

This application is a continuation-in-part application and claims the benefit of U.S. non-provisional application Ser. No. 12/830,419, which was filed on Jul. 5, 2010 and is incorporated herein by reference. The U.S. non-provisional application Ser. No. 12/830,419 is a continuation-in-part application and claims the benefit of U.S. non-provisional application Ser. No. 12/732,177, which was filed on Mar. 25, 2010 and entitled "LOW COMPLEXITY VIDEO DECODER".

BACKGROUND

The present invention relates to video decoding, and more particularly, to a method for adaptively performing video decoding, and to an associated adaptive complexity video decoder and an associated adaptive audio/video playback system.

When an end user is viewing a video program utilizing a home theater system at home, encoded data of the video program is decoded for being displayed on a display panel of the home theater system, and the decoded results of the encoded data can be scaled up or scaled down to meet the size and resolution of the display panel. Typically, a decoding device of the home theater system can decode the encoded data with ease, no matter how complicated the algorithm for decoding the encoded data is, and no matter whether the resolution of the video program is high or not.

It would be very convenient for the end user to own a portable electronic device (e.g. a mobile phone or a personal digital assistant (PDA)) that can be utilized for viewing the same video program anywhere. However, when a research and development (R&D) team of a manufacturer is designing such a portable electronic device, some problems may arise. For example, the decoding capability of the portable electronic device may be insufficient in a situation where the algorithm for decoding the encoded data is too complicated and/or the resolution of the video program is high. In another example, the power consumption may be too high when one or more processing circuits within the portable electronic device operate at the highest operation frequency available. Thus, there is a need for highly efficient and cost effective video decoders, in order to playback video with acceptable quality using portable electronic devices with limited computing capability.

SUMMARY

It is therefore an objective of the claimed invention to provide a method for adaptively performing video decoding, and to provide an associated adaptive complexity video decoder and an associated adaptive audio/video playback system, in order to solve the above-mentioned problems.

It is another objective of the claimed invention to provide a method for adaptively performing video decoding, and to provide an associated adaptive complexity video decoder and an associated adaptive audio/video playback system, in order to selectively reduce the calculation load and the power consumption within a portable electronic device such as that mentioned above and/or perform adaptive audio/video playback adjustment.

It is another objective of the claimed invention to provide a method for adaptively performing video decoding, and to provide an associated adaptive complexity video decoder and an associated adaptive audio/video playback system, in order to selectively reduce complexity of decoding operations by selectively making one or more components therein operate in accordance with the resolution of reconstructed frames to be displayed, rather than the resolution of original frames, since the resolution of a display panel of the portable electronic device is typically limited, and is typically lower than the resolution of the original frames. As a result, scaling down the reconstructed frames sometimes can be avoided.

An exemplary embodiment of a method for adaptively performing video decoding comprises: performing decoding complexity management based upon a parameter representing processing capability related to an adaptive complexity video decoder, in order to determine whether to reduce decoding complexity of at least one component of a plurality of components within the adaptive complexity video decoder; and selectively reducing decoding complexity of a portion of components within the adaptive complexity video decoder.

An exemplary embodiment of an associated adaptive complexity video decoder comprises a plurality of components and a decoding complexity manager. The plurality of components is arranged to perform operations related to video decoding. In addition, the decoding complexity manager is arranged to perform decoding complexity management based upon a parameter representing processing capability related to the adaptive complexity video decoder, in order to determine whether to reduce decoding complexity of at least one component within the adaptive complexity video decoder. Additionally, the decoding complexity manager selectively reduces decoding complexity of a portion of components within the adaptive complexity video decoder.

An exemplary embodiment of an associated adaptive audio/video playback system comprises an audio decoder and a video decoder. The audio decoder is arranged to perform audio decoding to generate audio information, and the video decoder is arranged to perform video decoding. In addition, the video decoder comprises a decoding manager, wherein the decoding manager delays audio playback of the audio information according to bit stream information of an input bit stream. In particular, the decoding manager of the video decoder can determine delaying the audio playback according to one or a combination of bit stream information of the input bit stream, a parameter representing processing capability, and a display buffer status. For example, according to one or a combination of bit stream information of the input bit stream, the parameter representing processing capability, and the display buffer status, the decoding manager of the video decoder determines whether to delay the audio playback. In another example, according to one or a combination of bit stream information of the input bit stream, the parameter representing processing capability, and the display buffer status, the decoding manager of the video decoder determines the delay amount of the audio playback.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
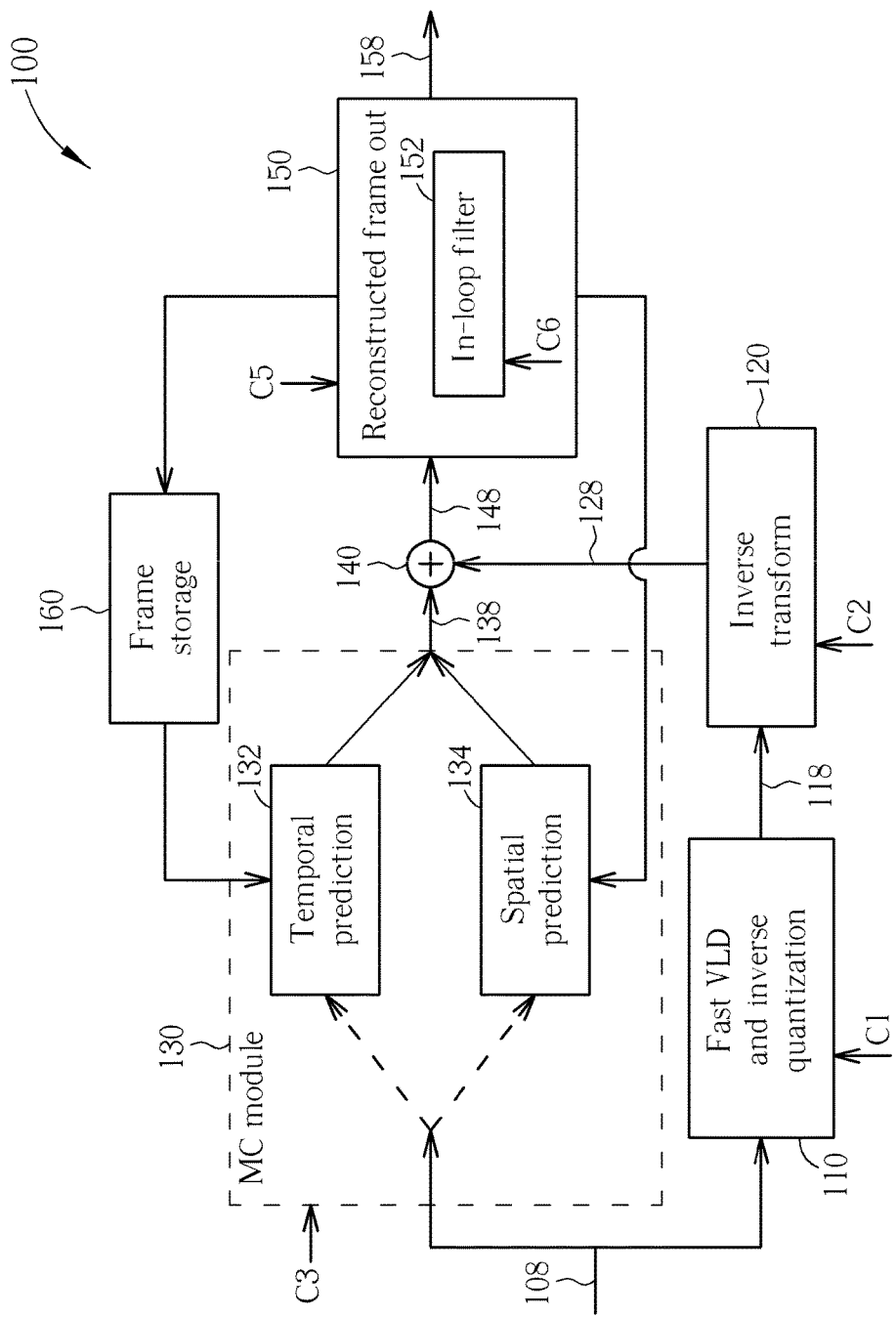
FIGS. 1A-1B illustrate an adaptive complexity video decoder according to a first embodiment of the present invention.
Figure 1B:
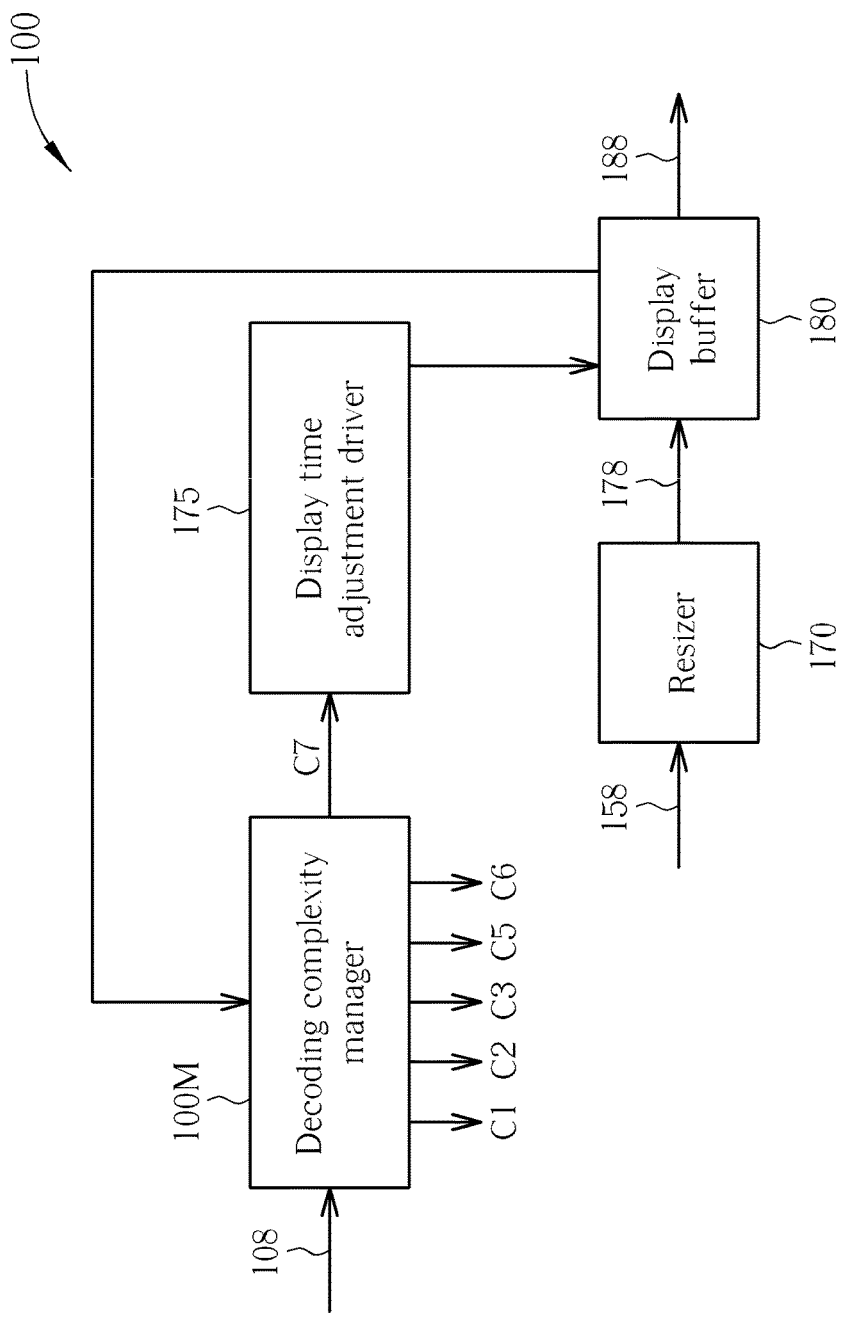

Please refer to FIGS. 1A-1B, which illustrate an adaptive complexity video decoder 100 according to a first embodiment of the present invention. The adaptive complexity video decoder 100 comprises a fast variable length decoding (VLD) and inverse quantization module 110 (labeled "Fast VLD and inverse quantization" in FIG. 1A), an inverse transform unit 120 (labeled "Inverse transform" in FIG. 1A) such as an inverse discrete cosine transform (IDCT) unit, a motion compensation module 130 (labeled "MC module" in FIG. 1A) comprising a temporal prediction unit 132 (labeled "Temporal prediction" in FIG. 1A) and a spatial prediction unit 134 (labeled "Spatial prediction" in FIG. 1A), an arithmetic unit 140 such as an adder, a reconstructed frame output unit 150 (labeled "Reconstructed frame out" in FIG. 1A) comprising a de-blocking filter such as an in-loop filter 152, and a frame storage 160 such as a frame buffer. In particular, the aforementioned de-blocking filter such as the in-loop filter 152 is an adaptive complexity de-blocking filter. Please note that the temporal prediction unit 132 and the spatial prediction unit 134 can be referred to as the inter prediction unit and the intra prediction unit, respectively. As shown in FIG. 1B, the adaptive complexity video decoder 100 further comprises a resizer 170, a display time adjustment driver 175, a display buffer 180, and a decoding complexity manager 100M.

According to this embodiment, the fast VLD and inverse quantization module 110 is arranged to perform fast VLD and inverse quantization on an input bit stream 108 to generate inverse quantization results 118, and the inverse transform unit 120 is arranged to perform inverse transform on the inverse quantization results 118 to generate inverse transform results 128. In addition, the motion compensation module 130 is arranged to perform motion compensation according to the input bit stream 108 and generate associated prediction outputs 138, where the temporal prediction unit 132 is arranged to perform temporal prediction and the spatial prediction unit 134 is arranged to perform spatial prediction. As shown in FIG. 1A, the arithmetic unit 140 is arranged to sum up the inverse transform results 128 and the prediction outputs 138 to generate reconstructed outputs 148, and the reconstructed frame output unit 150 is arranged to generate a plurality of reconstructed frames 158, where the spatial prediction unit 134 performs spatial prediction according to reconstructed data output from the reconstructed frame output unit 150. In addition, the frame storage 160 is arranged to temporarily store at least one portion of the reconstructed frames 158, where the temporal prediction unit 132 performs temporal prediction according to the aforementioned at least one portion of the reconstructed frames 158.

Referring to FIG. 1B, the resizer 170 is arranged to perform image resizing (e.g. scaling up or scaling down an image) when needed. In a situation where image resizing is performed, the image frames 178 comprise a resized version of the reconstructed frames 158. In a situation where image resizing is not performed, the image frames 178 comprise the reconstructed frames 158, that is, the resizer 170 bypasses the reconstructed frames 158. In addition, the display buffer 180 is arranged to temporarily store the image frames 178. Under control of the display time adjustment driver 175, the image frames 178 that are temporarily stored in the display buffer 180 can be retrieved as output frames 188 for being displayed at appropriate time points corresponding to audio playback of associated audio information. Thus, by utilizing the display time adjustment driver 175, the adaptive complexity video decoder 100 can synchronize audio and video playback of an audio/video playback system (not shown in FIGS. 1A-1B), in order to eliminate video decoding delay (if exists). For example, video decoding delay may occur when there is a heavy workload of video decoding. Additionally, the decoding complexity manager 100M can perform decoding complexity management based upon the input bit stream 108 and display buffer status from the display buffer 180. For example, the decoding complexity manager 100M can selectively reduce decoding complexity of a portion of components within the adaptive complexity video decoder 100. More specifically, the decoding complexity manager 100M can generate a plurality of control signals, such as the control signals C1, C2, C3, C5, C6, and C7, according to the input bit stream 108 and the aforementioned display buffer status, in order to control decoding complexity of associated components respectively controlled by the control signals C1, C2, C3, C5, C6, and C7

(e.g. the fast VLD and inverse quantization module 110, the inverse transform unit 120, the motion compensation module 130, the reconstructed frame output unit 150, the aforementioned de-blocking filter such as the in-loop filter 152, and the display time adjustment driver 175) within the adaptive complexity video decoder 100, respectively.

In particular, at least one portion of the adaptive complexity video decoder 100, such as the temporal prediction unit 132, the spatial prediction unit 134, the inverse transform unit 120, the reconstructed frame output unit 150, and/or the fast VLD and inverse quantization module 110, may operate in accordance with the resolution of the reconstructed frames 158, rather than the resolution of the original frames represented by the input bit stream 108, in order to reduce complexity of decoding operations. The reduced resolution frame can be achieved by down sampling the frame, for example, by selecting particular pixels to represent each block of the frame, such as selecting the bottom right pixels of each 2 by 2 pixels. In an embodiment, the temporal prediction unit 132 can operate in accordance with the resolution of the reconstructed frames 158, rather than the resolution of the original frames, in order to reduce complexity of temporal prediction. For example, the temporal prediction unit 132 can further estimate at least a portion of partial information that has been omitted for use of performing the temporal prediction. In addition, the spatial prediction unit 134 can operate in accordance with the resolution of the reconstructed frames 158, rather than the resolution of the original frames, in order to reduce complexity of spatial prediction. For example, the spatial prediction unit 134 can further estimate at least a portion of partial information that has been omitted for use of performing the spatial prediction. According to this embodiment, the inverse transform unit 120 can operate in accordance with the resolution of the reconstructed frames 158, rather than the resolution of the original frames, in order to reduce complexity of inverse transform. For example, the inverse transform unit 120 can omit a portion of calculations of the inverse transform by selecting one of a plurality of predetermined inverse transform functions $F_{IT}$ for use of the inverse transform. In addition, the reconstructed frame output unit 150 can operate in accordance with the resolution of the reconstructed frames 158, rather than the resolution of the original frames, in order to reduce complexity of generating the reconstructed frames. Based upon whether one or more conditions are satisfied, the in-loop filter 152 can selectively perform in-loop filtering for use of de-blocking corresponding to one of a plurality of levels of complexity, for example, full de-blocking, partial de-blocking, and skip de-blocking. Additionally, the fast VLD and inverse quantization module 110 can operate in accordance with the resolution of the reconstructed frames 158, rather than the resolution of the original frames, in order to reduce complexity of performing fast VLD and inverse quantization. More particularly, in order to reduce the complexity, the fast VLD and inverse quantization module 110 can utilize a lookup table comprising a main table and at least one sub-table (e.g. one or more sub-tables) during decoding, where the probability of utilizing the main table is higher than that of the at least one sub-table due to a predetermined arrangement of the lookup table in a design phase of the adaptive complexity video decoder 100.

According to some variations of this embodiment, at least a portion of the adaptive complexity video decoder 100 can omit partial information being processed by the portion of the adaptive complexity video decoder 100, in order to reduce complexity of decoding the input bit stream 108. Similar descriptions for these variations are not repeated in detail here.

Figure 1C:
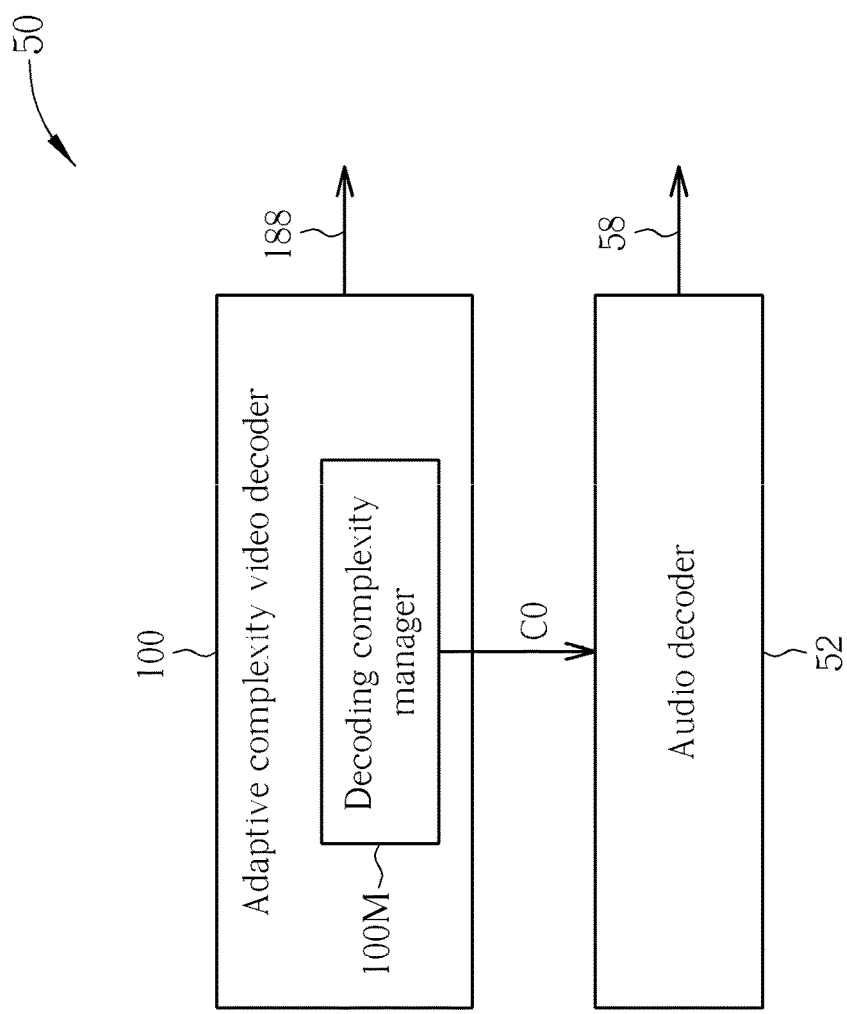
FIG. 1C illustrates an adaptive audio/video playback system according to a variation of the first embodiment.

FIG. 1C illustrates an adaptive audio/video playback system 50 according to a variation of the first embodiment. The adaptive audio/video playback system 50 comprises an audio decoder 52 and the adaptive complexity video decoder 100. The audio decoder 52 is arranged to perform audio decoding to generate audio information 58. In addition, the adaptive complexity video decoder 100 is capable of performing video decoding as disclosed in the first embodiment. Please note that the decoding complexity manager 100M is arranged to perform decoding complexity management based upon the input bit stream 108 when needed, and the decoding complexity manager 100M selectively reduces decoding complexity of a portion of components within the adaptive complexity video decoder 100. For example, the decoding complexity manager 100M reduces the decoding complexity of one or more components within the adaptive complexity video decoder 100. In another example, the decoding complexity manager 100M delays audio playback of the audio information 58, rather than reducing the decoding complexity of any component within the adaptive complexity video decoder 100. Thus, the decoding complexity manager 100M can maintain audio/video playback synchronization between video playback and audio playback of the adaptive audio/video playback system 50 by properly delaying the audio playback of the adaptive audio/video playback system 50, in the case when the video decoder is not capable of promptly decoding and outputting frames matched with the audio playback. As shown in FIG. 1C, the decoding complexity manager 100M generates at least one control signal C0 to control whether to delay the audio playback of the audio information 58 and/or the delay amount of the audio playback of the audio information 58. In practice, the decoding complexity manager 100M can determine delaying the audio playback of the audio information 58 according to one or a combination of bit stream information of the input bit stream 108, a parameter representing processing capability, and a display buffer status. For example, according to one or a combination of bit stream information of the input bit stream 108, the parameter representing processing capability, and the display buffer status, the decoding complexity manager 100M determines whether to delay the audio playback of the audio information 58. In another example, according to one or a combination of bit stream information of the input bit stream 108, the parameter representing processing capability, and the display buffer status, the decoding complexity manager 100M determines the delay amount of the audio playback of the audio information 58. Similar descriptions for this variation are not repeated in detail here.

Figure 1D:
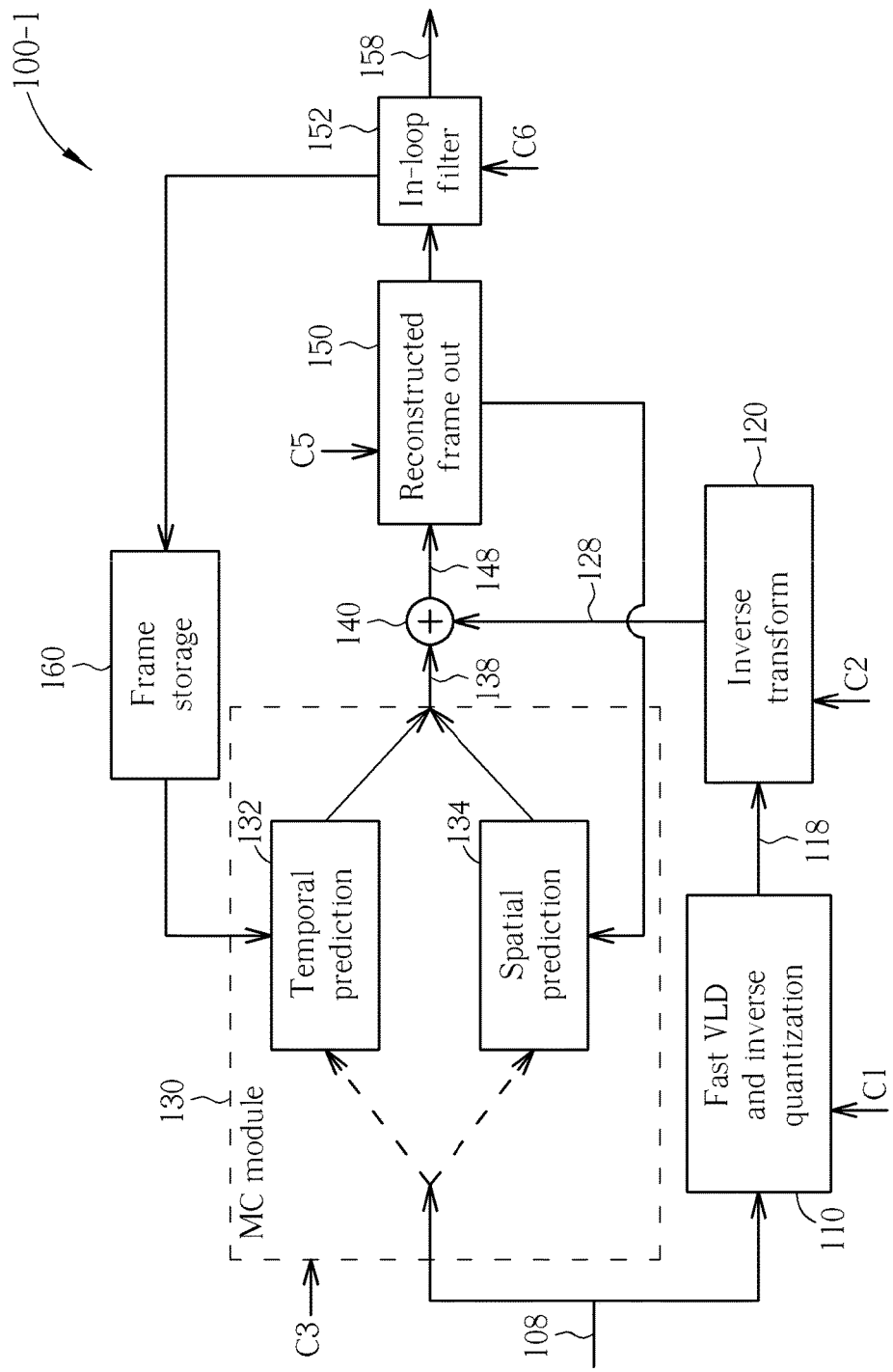
FIG. 1D illustrates an adaptive complexity video decoder according to a second embodiment of the present invention.

FIG. 1D illustrates an adaptive complexity video decoder 100-1 according to a second embodiment of the present invention. This embodiment is a variation of the first embodiment. As shown in FIG. 1D, the aforementioned de-blocking filter such as the in-loop filter 152 is positioned outside the reconstructed frame output unit 150 (labeled "Reconstructed frame out" in FIG. 1D) of this embodiment, rather than being positioned within the reconstructed frame output unit 150. Please note that the implementation of the other components within the adaptive complexity video decoder 100-1 (e.g. the fast VLD and inverse quantization module 110, the inverse transform unit 120, the motion compensation module 130, the arithmetic unit 140, the frame storage 160) can be the same as that of the associated components within the adaptive complexity video decoder 100 shown in FIG. 1A. In this embodiment, the elements in FIG. 1B can also be coupled to FIG. 1D. Similar descriptions for this embodiment are not repeated in detail here.

According to some variations of this embodiment, at least a portion of the adaptive complexity video decoder 100-1 can omit partial information being processed by the portion of the adaptive complexity video decoder 100-1, in order to reduce complexity of decoding the input bit stream 108. Similar descriptions for these variations are not repeated in detail here.

Figure 1E:
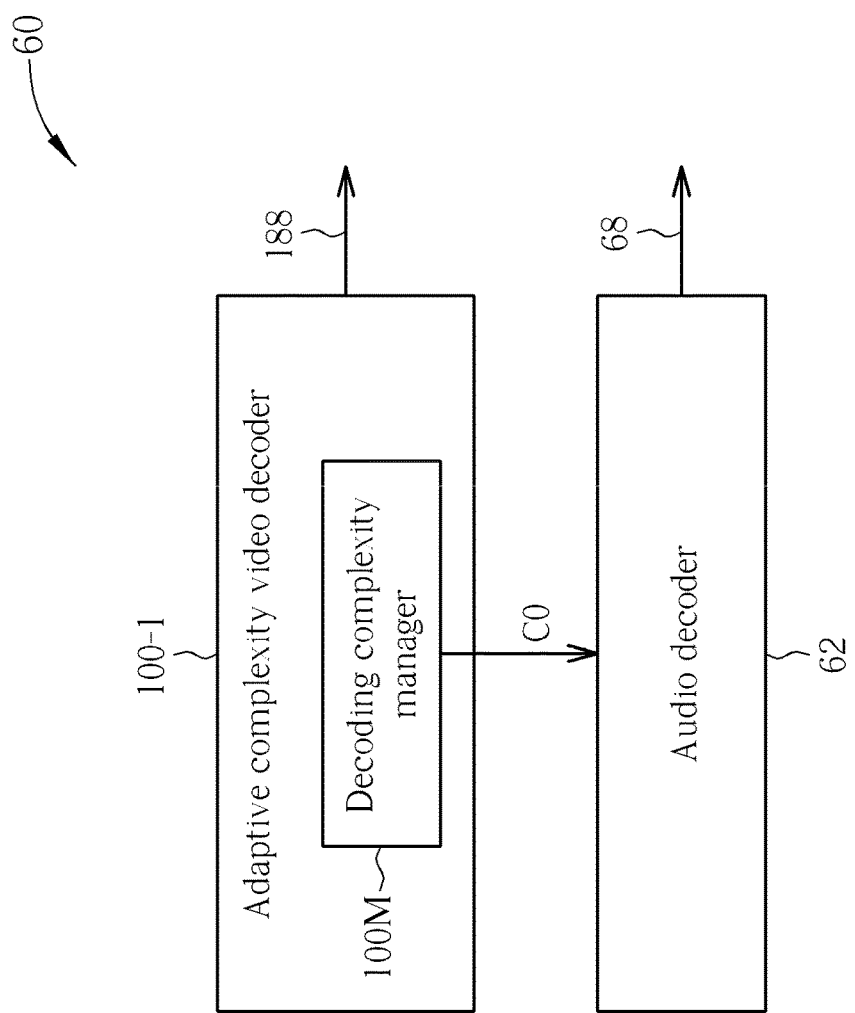
FIG. 1E illustrates an adaptive audio/video playback system according to a variation of the second embodiment.

FIG. 1E illustrates an adaptive audio/video playback system 60 according to a variation of the second embodiment. The adaptive audio/video playback system 60 comprises an audio decoder 62 and the adaptive complexity video decoder 100-1. The audio decoder 62 is arranged to perform audio decoding to generate audio information 68. In addition, the adaptive complexity video decoder 100-1 is capable of performing video decoding as disclosed in the second embodiment. Please note that the decoding complexity manager 100M is arranged to perform decoding complexity management based upon the input bit stream 108 when needed, and the decoding complexity manager 100M selectively reduces decoding complexity of a portion of components within the adaptive complexity video decoder 100-1. For example, the decoding complexity manager 100M reduces the decoding complexity of one or more components within the adaptive complexity video decoder 100-1. In another example, the decoding complexity manager 100M delays audio playback of the audio information 68, rather than reducing the decoding complexity of any component within the adaptive complexity video decoder 100-1. Thus, the decoding complexity manager 100M can maintain audio/video playback synchronization between video playback and audio playback of the adaptive audio/video playback system 60 by properly delaying the audio playback of the adaptive audio/video playback system 60, in order to deal with the problem of any video decoding delay. As shown in FIG. 1E, the decoding complexity manager 100M generates at least one control signal such as the aforementioned at least one control signal C0 to control whether to delay the audio playback of the audio information 68 and/or the delay amount of the audio playback of the audio information 68. In practice, the decoding complexity manager 100M can determine delaying the audio playback of the audio information 68 according to one or a combination of bit stream information of the input bit stream 108, a parameter representing processing capability, and a display buffer status, such as those mentioned in the embodiment shown in FIG. 1C. For example, according to one or a combination of bit stream information of the input bit stream 108, the parameter representing processing capability, and the display buffer status, the decoding complexity manager 100M determines whether to delay the audio playback of the audio information 68. In another example, according to one or a combination of bit stream information of the input bit stream 108, the parameter representing processing capability, and the display buffer status, the decoding complexity manager 100M determines the delay amount of the audio playback of the audio information 68. Similar descriptions for this variation are not repeated in detail here.

Figure 2:
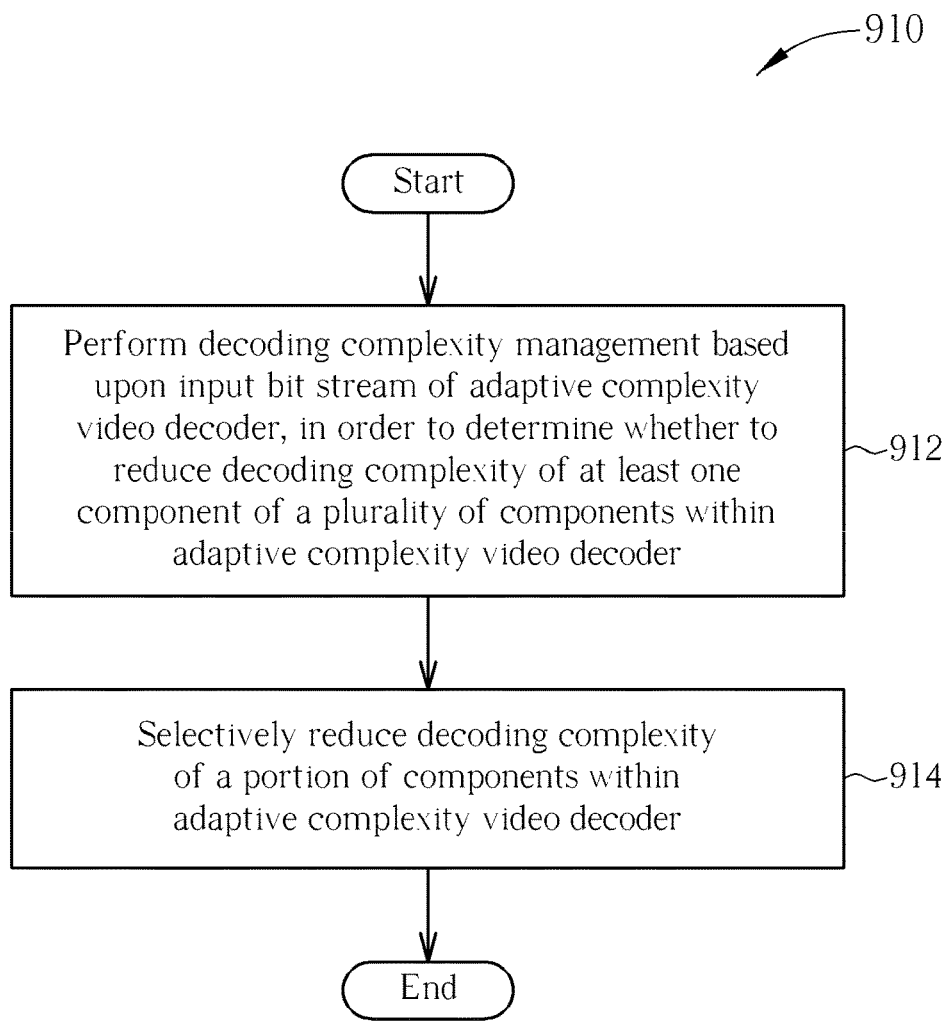
FIG. 2 is a flowchart of a method for adaptively performing video decoding according to one embodiment of the present invention.

By utilizing the architecture of any of the embodiments/variations disclosed above, the complexity of video decoding of respective components can be adjusted. For example, under control of the decoding complexity manager 100M, one or more components within the adaptive complexity video decoder 100 of the first embodiment (or one of the variations thereof) or within the adaptive complexity video decoder 100-1 of the second embodiment (or one of the variations thereof) can operate with a lower level of video decoding complexity. In another example, under control of the decoding complexity manager 100M, all of the components within the adaptive complexity video decoder 100 of the first embodiment (or one of the variations thereof) or within the adaptive complexity video decoder 100-1 of the second embodiment (or one of the variations thereof) can operate with the highest level of video decoding complexity when it is determined that reducing the decoding complexity of any component within the adaptive complexity video decoder 100 or the adaptive complexity video decoder 100-1 is not required. Referring to FIG. 2, more details are further described as follows.

FIG. 2 is a flowchart of a method 910 for adaptively performing video decoding according to one embodiment of the present invention. The method 910 can be applied to the adaptive complexity video decoder 100 shown in FIGS. 1A-1B or the adaptive complexity video decoder 100-1 shown in FIG. 1D, and more particularly, to the decoding complexity manager 100M of any of the embodiments/variations disclosed above. The method 910 is described as follows.

In Step 912, the decoding complexity manager 100M performs decoding complexity management based upon the input bit stream 108 of the adaptive complexity video decoder under consideration (e.g. the adaptive complexity video decoder 100 of the first embodiment or the adaptive complexity video decoder 100-1 of the second embodiment), in order to determine whether to reduce decoding complexity of at least one component of a plurality of components within the adaptive complexity video decoder mentioned above. For example, the plurality of components may comprise the fast VLD and inverse quantization module 110, the inverse transform unit 120, the motion compensation module 130, the reconstructed frame output unit 150, the aforementioned de-blocking filter such as the in-loop filter 152, and the display time adjustment driver 175.

In Step 914, the decoding complexity manager 100M selectively reduces the decoding complexity of a portion of components within the adaptive complexity video decoder mentioned in Step 912. For example, the decoding complexity manager 100M can selectively reduce the decoding complexity of at least one portion (e.g. a portion or all) of the fast VLD and inverse quantization module 110, the inverse transform unit 120, the motion compensation module 130, the reconstructed frame output unit 150, the aforementioned de-blocking filter such as the in-loop filter 152, and the display time adjustment driver 175 at a specific time point. In another example, the decoding complexity manager 100M reduces the decoding complexity of none of the fast VLD and inverse quantization module 110, the inverse transform unit 120, the motion compensation module 130, the reconstructed frame output unit 150, the aforementioned de-blocking filter such as the in-loop filter 152, and the display time adjustment driver 175 at another time point.

According to this embodiment, the decoding complexity manager 100M can perform decoding complexity management by referring to one or a combination of a display buffer status of the display buffer 180, one or more parameter representing processing capability of the adaptive complexity video decoder mentioned in Step 912, and bit stream information of the input bit stream 108, where the bit stream information may comprise a bit rate, resolution, and/or frame type. Some other examples of the bit stream information comprise motion vectors, residuals such as direct current (DC) values, IDCT coefficients, a length of the bit stream, or the bit stream information that can be derived, for example, based on comparison and/or historical statistics, from the above exemplary bit stream information. In an embodiment, the decoding complexity manger 100M adjusts decoding complexity according to a variation of motion vectors. The parameter representing processing capability may comprise statistics of decoding time required per frame (for example, an average decoding time per frame can be used by the decoding complexity manager 100M), processor-related information (for example, number of available CPU(s) for the adaptive complexity video decoder 100, number of available GPU(s) adaptive complexity video decoder 100, or any other type of processor-related information), a temperature-related value related to the adaptive complexity video decoder 100, any other parameter for representing processing capability, or combination thereof to judge the current system capability and thus adjust decoding complexity adaptively. In particular, the decoding complexity manager 100M may perform decoding complexity management based upon all of the aforementioned display buffer status of the display buffer 180, the aforementioned at least one parameter, and the bit stream information of the input bit stream 108.

Figure 3:
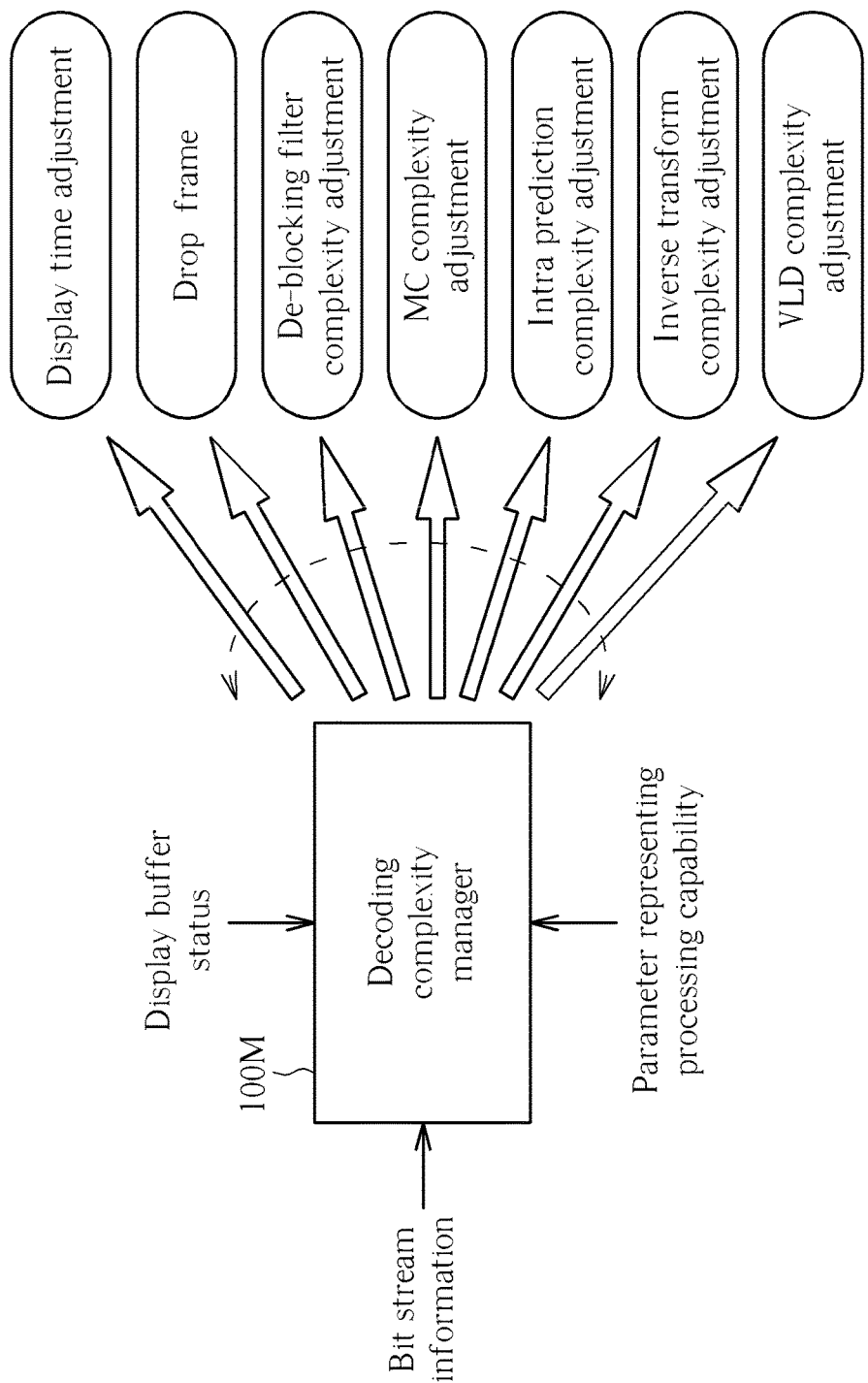
FIG. 3 illustrates some operations that the decoding complexity manager shown in FIG. 1B may trigger regarding decoding complexity management of the method shown in FIG. 2 according to an embodiment of the present invention.

FIG. 3 illustrates some operations that the decoding complexity manager 100M may trigger regarding the decoding complexity management of the method 910 shown in FIG. 2 according to an embodiment of the present invention. For example, the operations that the decoding complexity manager 100M may trigger comprise operations of display time adjustment, dropping frame (labeled "Drop frame" in FIG. 3), de-blocking filter complexity adjustment, motion compensation complexity adjustment (labeled "MC complexity adjustment" in FIG. 3), intra prediction complexity adjustment, inverse transform complexity adjustment, and VLD complexity adjustment. Based upon one or a combination of the aforementioned display buffer status of the display buffer 180, parameter representing processing capability, and bit stream information of the input bit stream 108, the decoding complexity manager 100M performs decoding complexity management and selectively trigger one or more of these operations.

Figure 4:
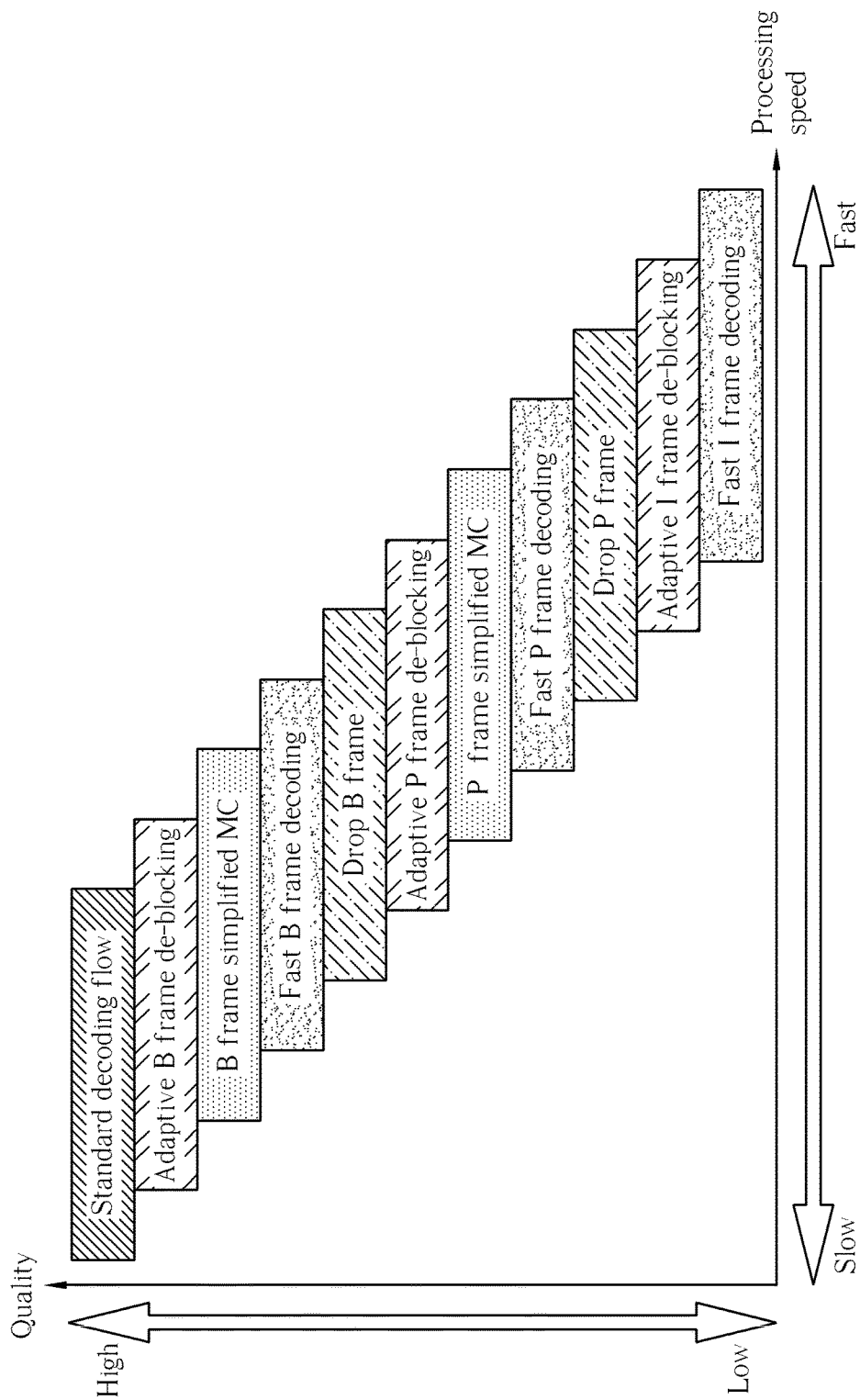
FIG. 4 illustrates the associated quality and processing speed of some operations/procedures that the decoding complexity manager may trigger regarding the decoding complexity management of the method shown in FIG. 2 according to an embodiment of the present invention.

FIG. 4 illustrates the associated quality and processing speed of some operations/procedures that the decoding complexity manager 100M may trigger regarding the decoding complexity management of the method 910 shown in FIG. 2 according to an embodiment of the present invention. For example, the operations/procedures comprise operations/procedures of standard decoding flow, adaptive B frame de-blocking (i.e. adaptively performing full or partial B frame de-blocking (de-blocking for B frames) or skipping B frame de-blocking), B frame simplified motion compensation (labeled "B frame simplified MC" in FIG. 4), fast B frame decoding (for example, decoding B frame in a down sampling domain), dropping B frame (labeled "Drop B frame" in FIG. 4), adaptive P frame de-blocking (i.e. adaptively performing full or partial P frame de-blocking (de-blocking for P frames) or skipping P frame de-blocking), P frame simplified motion compensation (labeled "P frame simplified MC" in FIG. 4), fast P frame decoding, dropping P frame (labeled "Drop P frame" in FIG. 4), adaptive I frame de-blocking (i.e. adaptively performing full or partial I frame de-blocking (de-blocking for I frames) or skipping I frame de-blocking), and fast I frame decoding. This is for illustrative purposes only, and is not meant to be a limitation of the present invention. The "Quality" label on the vertical axis may indicate image quality, fluency, user perception, system resource saving, or a combined evaluation of various quality indications. According to some variations of this embodiment, the associated quality and processing speed of these operations/procedures may vary in different situations. For example, among the operations/procedures shown in FIG. 4, the operation/procedure of dropping B frame (labeled "Drop B frame" in FIG. 4) can be inserted between the operation/procedure of standard decoding flow and the operation/procedure of adaptive B frame de-blocking. In another example, among the operations/procedures shown in FIG. 4, the operation/procedure of adaptive I frame de-blocking can be inserted between the operation/procedure of P frame simplified motion compensation (labeled "P frame simplified MC" in FIG. 4) and the operation/procedure of fast P frame decoding. In another example, among the operations/procedures shown in FIG. 4, the operation/procedure of dropping P frame (labeled "Drop P frame" in FIG. 4) can be next to the operation/procedure of fast I frame decoding, and therefore, become the bottommost one among the operations/procedures shown in FIG. 4.

In this embodiment, based upon a first strategy of achieving the best quality available, the decoding complexity manager 100M can trigger the operation/procedure of standard decoding flow when the problem of video decoding delay is not an issue. However, when it is determined that the video decoding delay may occur (e.g. it is detected that the hardware resources are insufficient and/or the decoding workload is greater than a predetermined threshold), the decoding complexity manager 100M can trigger one or more operation/procedure, in order to prevent serious video decoding delay and achieve the best quality that the decoder may offer under current situation. For example, among the operations/procedures shown in FIG. 4, the decoding complexity manager 100M can trigger the next operation/procedure applicable (e.g. the operation/procedure of adaptive B frame de-blocking, the operation/procedure of B frame simplified motion compensation, etc.), in order to release the hardware resources and/or reduce the decoding workload, where an operation/procedure corresponding to a higher quality level has higher priority to be executed when reducing the decoding complexity, and an operation/procedure corresponding to a lower quality level will be executed last. This is for illustrative purposes only, and is not meant to be a limitation of the present invention. According to a variation of this embodiment, the decoding complexity manager 100M can operate based upon a second strategy of achieving a predetermined level of quality, rather than achieving the best quality. According to some other variations of this embodiment, the decoding complexity manager 100M can operate based upon some strategies of achieving the fastest processing speed or a predetermined processing speed.

Figure 5:
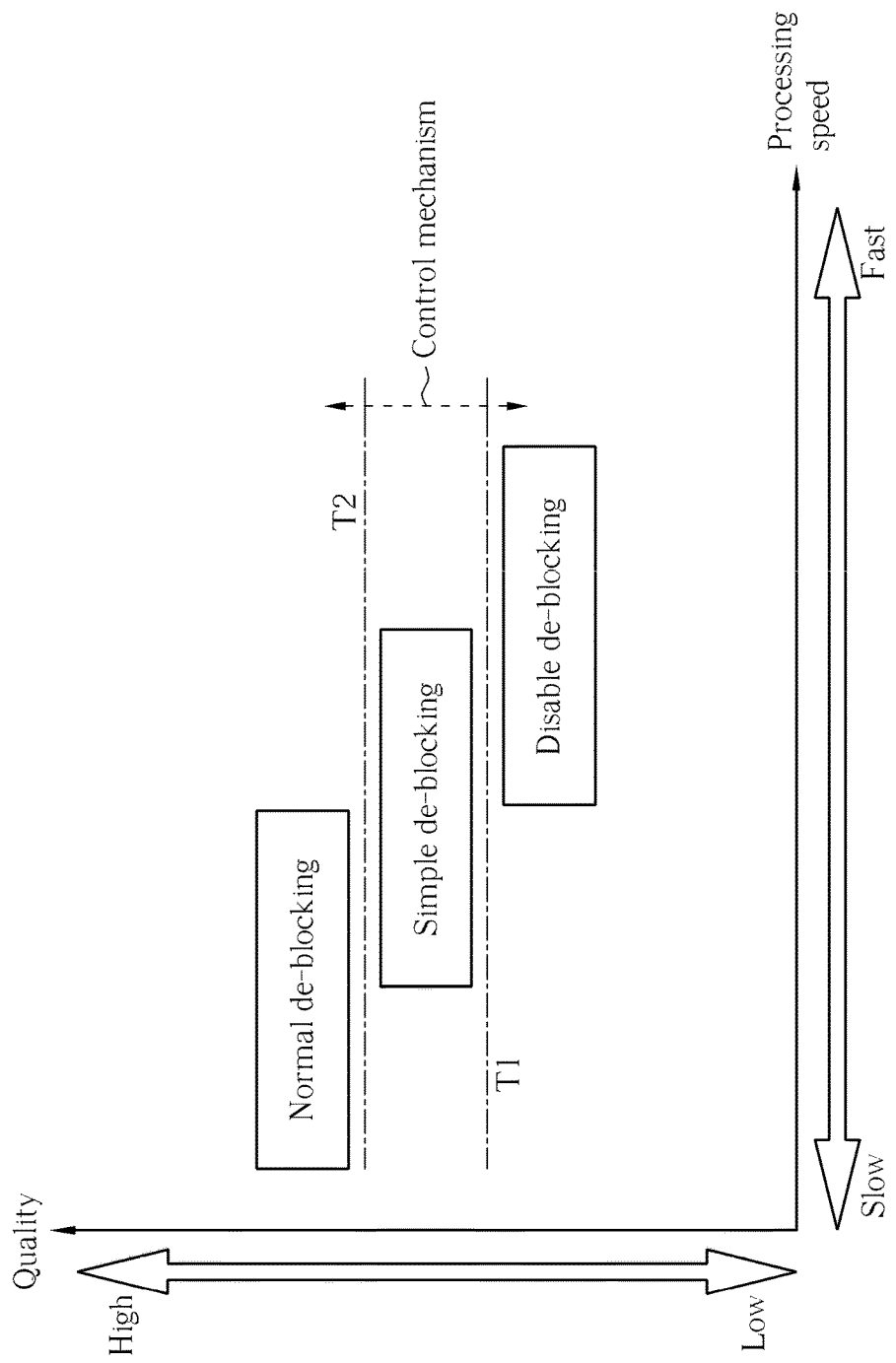
FIG. 5 illustrates the associated quality and processing speed of some operations/procedures that the decoding complexity manager may trigger regarding the decoding complexity management of the method shown in FIG. 2 according to another embodiment of the present invention.

FIG. 5 illustrates the associated quality and processing speed of some operations/procedures that the decoding complexity manager 100M may trigger regarding the decoding complexity management of the method 910 shown in FIG. 2 according to another embodiment of the present invention. In particular, the operations/procedures under consideration in this embodiment comprise operations/procedures of utilizing normal de-blocking (labeled "Normal de-blocking" in FIG. 5), utilizing simple de-blocking (labeled "Simple de-blocking" in FIG. 5), and disabling de-blocking (labeled "Disable de-blocking" in FIG. 5). Please note that the control mechanism of the decoding complexity manager 100M can switch between these operations/procedures according to a plurality of predetermined threshold values T1 and T2, where the predetermined threshold values T1 and T2 represent associated levels of quality.

Figure 6:
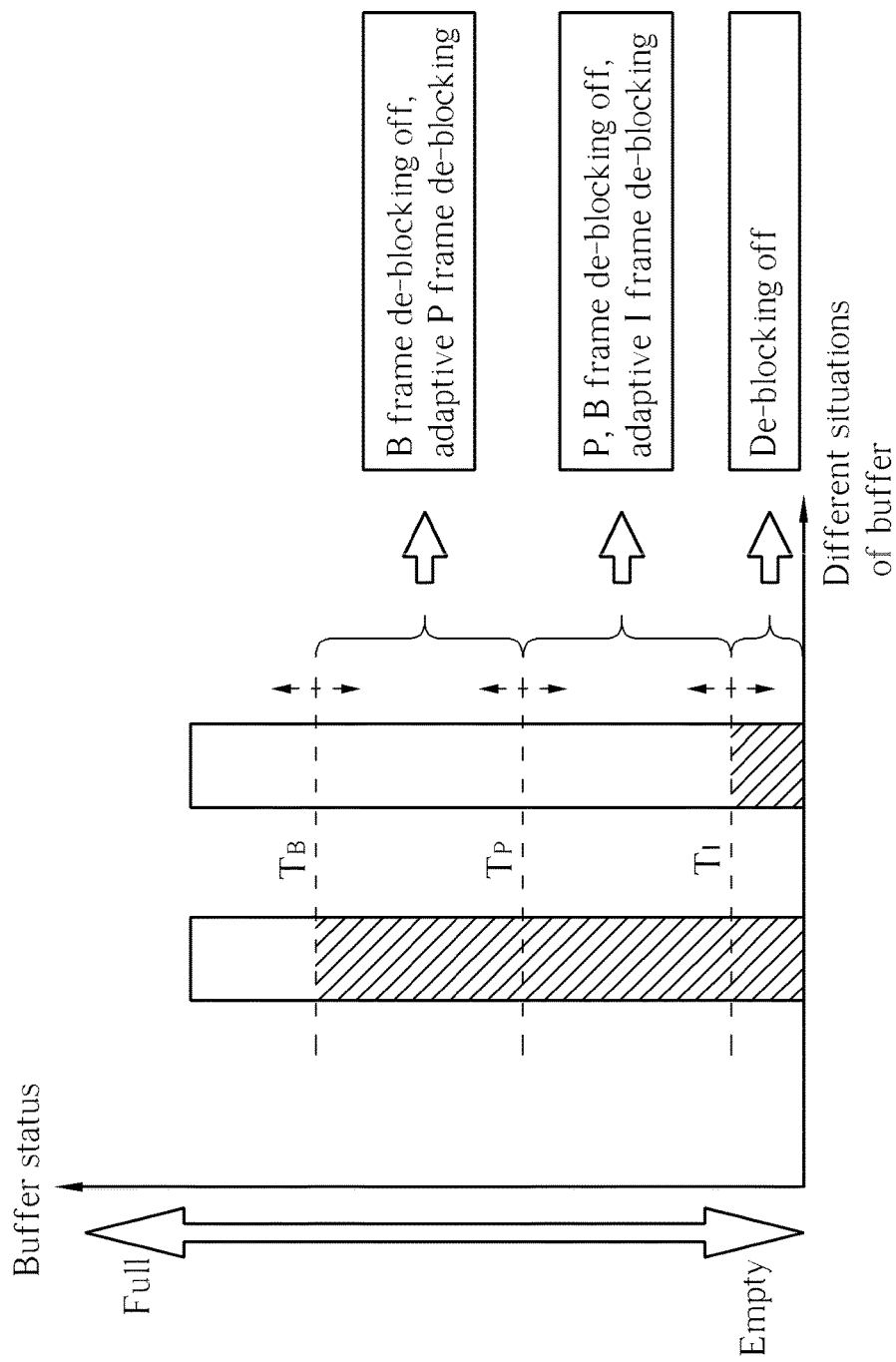
FIG. 6 illustrates some operations/procedures that the decoding complexity manager may trigger in different situations regarding the decoding complexity management of the method shown in FIG. 2 according to another embodiment of the present invention.

FIG. 6 illustrates some operations/procedures that the decoding complexity manager 100M may trigger in different situations regarding the decoding complexity management of the method 910 shown in FIG. 2 according to another embodiment of the present invention. In particular, the operations/procedures under consideration in this embodiment comprise operations/procedures of B frame de-blocking off, P frame de-blocking off, adaptive P frame de-blocking, adaptive I frame de-blocking, and de-blocking off. Please note that the control mechanism of the decoding complexity manager 100M can switch between these operations/procedures according to a plurality of predetermined threshold values $T_I$, $T_P$, and $T_B$, where the predetermined threshold values $T_I$, $T_P$, and $T_B$ represent associated levels of buffer status. In this embodiment, the predetermined threshold values $T_B$, $T_P$, and $T_I$ are utilized for determining whether to turn on/off B frame de-blocking, P frame de-blocking, and I frame de-blocking, respectively. In particular, in a situation where the display buffer 180 is full or almost full, the decoding complexity manager 100M does not turn off any of I frame de-blocking, P frame de-blocking, and B frame de-blocking. On the contrary, in a situation where the display buffer 180 is empty or almost empty, the decoding complexity manager 100M turns off each of I frame de-blocking, P frame de-blocking, and B frame de-blocking.

More specifically, in a situation where the buffer status of the display buffer 180 (and more particularly, the buffer level thereof) is between the predetermined threshold values $T_P$ and $T_B$, the decoding complexity manager 100M turns off B frame de-blocking, and triggers the operation/procedure of adaptive P frame de-blocking (i.e. P frame de-blocking with adaptive complexity). In addition, in a situation where the buffer status of the display buffer 180 (and more particularly, the buffer level thereof) is between the predetermined threshold values $T_I$ and $T_P$, the decoding complexity manager 100M turns off P frame de-blocking and B frame de-blocking, and triggers the operation/procedure of adaptive I frame de-blocking (i.e. I frame de-blocking with adaptive complexity). Additionally, in a situation where the buffer status of the display buffer 180 (and more particularly, the buffer level thereof) is between the predetermined threshold value $T_I$ and zero, the decoding complexity manager 100M turns off I frame de-blocking, P frame de-blocking, and B frame de-blocking.

In this embodiment, regarding the control mechanism of adaptive complexity de-blocking, the decoding complexity manager 100M can operate based upon a macroblock (MB) based de-blocking scheme. For example, the decoding complexity manager 100M can adaptively turn on/off I frame de-blocking, P frame de-blocking, and/or B frame de-blocking according to the buffer status and a bit stream length of at least one portion (e.g. a portion or all) of the input bit stream 108. This is for illustrative purposes only, and is not meant to be a limitation of the present invention. According to a variation of this embodiment, regarding the control mechanism of adaptive complexity de-blocking, the decoding complexity manager 100M can operate based upon a frame based de-blocking scheme. For example, the decoding complexity manager 100M can adaptively turn on/off I frame de-blocking, P frame de-blocking, and/or B frame de-blocking according to the buffer status, a bit stream length of at least one portion (e.g. a portion or all) of the input bit stream 108, a quantization step size (e.g. the so-called QP value), an MB type, and/or edge strength.

It is an advantage of the present invention that the present invention method and the associated adaptive complexity video decoder and the associated adaptive audio/video playback system of each embodiment/variations disclosed above can be applied to various kinds of digital video applications, where at least one portion (e.g. a portion or all) of the plurality of components within the adaptive complexity video decoder can operate with a lower level of complexity of video decoding. As the complexity of video decoding of one or more components can be adjusted, the decoding workload and the associated power consumption can be adaptively reduced. Therefore, in contrast to the related art, the present invention provides great flexibility of implementing digital video playback systems.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for adaptively performing video decoding, comprising:
   performing decoding complexity management based upon a parameter representing processing capability related to an adaptive complexity video decoder, in order to determine whether to reduce decoding complexity of at least one component of a plurality of components within the adaptive complexity video decoder, wherein the plurality of components comprises:
      a fast variable length decoding (VLD) and inverse quantization module arranged to perform fast VLD and inverse quantization on an input bit stream of the adaptive complexity video decoder to generate inverse quantization results;
      an inverse transform unit arranged to perform inverse transform on the inverse quantization results to generate inverse transform results;
      a motion compensation module arranged to perform motion compensation according to the input bit stream and generate associated prediction outputs, wherein the motion compensation module comprises:
         a temporal prediction unit arranged to perform temporal prediction to generate at least a portion of the prediction outputs; and
         a spatial prediction unit arranged to perform spatial prediction to generate at least a portion of the prediction outputs;
      an arithmetic unit arranged to sum up the inverse transform results and the prediction outputs to generate compensated outputs;
      a reconstructed frame output unit arranged to generate a plurality of reconstructed frames according to the compensated outputs, wherein the spatial prediction unit performs spatial prediction according to a current reconstructed frame of the reconstructed frames; and
      a frame storage arranged to temporarily store at least one portion of the reconstructed frames, wherein the temporal prediction unit performs temporal prediction according to the at least one portion of the reconstructed frames; and
   selectively reducing decoding complexity of a portion of components within the adaptive complexity video decoder.

2. The method of claim 1, wherein the plurality of components comprises:
   a display buffer arranged to temporarily store a plurality of image frames;
   wherein the step of performing decoding complexity management based upon the parameter representing processing capability related to the adaptive complexity video decoder, comprises:
   performing decoding complexity management based upon a display buffer status of the display buffer.

3. The method of claim 1, wherein the step of performing decoding complexity management based upon the parameter representing processing capability related to the adaptive complexity video decoder comprises:
   generating at least one control signal in order to control decoding complexity of the portion of components within the adaptive complexity video decoder.

4. The method of claim 1, wherein the plurality of components comprises:
   a display time adjustment driver, wherein under control of the display time adjustment driver, image frames temporarily stored in a display buffer are retrieved as output frames for being displayed at time points of audio playback of associated audio information, respectively.

5. The method of claim 1, wherein the parameter representing processing capability related to the adaptive complexity video decoder comprises statistics of decoding time required per frame.

6. The method of claim 1, wherein the parameter representing processing capability related to the adaptive complexity video decoder comprises processor-related information related to the adaptive complexity video decoder.

7. The method of claim 1, wherein the parameter representing processing capability related to the adaptive complexity video decoder comprises a temperature-related value related to adaptive complexity video decoder.

8. An adaptive complexity video decoder, comprising:
   a plurality of components arranged to perform operations related to video decoding, wherein the plurality of components comprises:
      a fast variable length decoding (VLD) and inverse quantization module arranged to perform fast VLD and inverse quantization on an input bit stream of the adaptive complexity video decoder to generate inverse quantization results;
      an inverse transform unit arranged to perform inverse transform on the inverse quantization results to generate inverse transform results;
      a motion compensation module arranged to perform motion compensation according to the input bit stream and generate associated prediction outputs, wherein the motion compensation module comprises:
         a temporal prediction unit arranged to perform temporal prediction to generate at least a portion of the prediction outputs; and
         a spatial prediction unit arranged to perform spatial prediction to generate at least a portion of the prediction outputs;
      an arithmetic unit arranged to sum up the inverse transform results and the prediction outputs to generate compensated outputs;
      a reconstructed frame output unit arranged to generate a plurality of reconstructed frames according to the compensated outputs, wherein the spatial prediction unit performs spatial prediction according to a current reconstructed frame of the reconstructed frames; and
      a frame storage arranged to temporarily store at least one portion of the reconstructed frames, wherein the temporal prediction unit performs temporal prediction according to the at least one portion of the reconstructed frames; and
   a decoding complexity manager arranged to perform decoding complexity management based upon a parameter representing processing capability related to the adaptive complexity video decoder, in order to determine whether to reduce decoding complexity of at least one component within the adaptive complexity video decoder;
   wherein the decoding complexity manager selectively reduces decoding complexity of a portion of components within the adaptive complexity video decoder.

9. The adaptive complexity video decoder of claim 8, wherein the plurality of components comprises:
   a display buffer arranged to temporarily store a plurality of image frames;
   wherein the decoding complexity manager is arranged to perform decoding complexity management based upon a display buffer status of the display buffer.

10. The adaptive complexity video decoder of claim 8, wherein the decoding complexity manager generates at least one control signal according to the parameter representing processing capability related to the adaptive complexity video decoder, in order to control decoding complexity of the portion of components respectively controlled by the control signals within the adaptive complexity video decoder.

11. The adaptive complexity video decoder of claim 8, wherein the plurality of components comprises:
   a display time adjustment driver, wherein under control of the display time adjustment driver, image frames temporarily stored in a display buffer are retrieved as output frames for being displayed at time points of audio playback of associated audio information, respectively.

12. The adaptive complexity video decoder of claim 8, wherein the parameter representing processing capability related to the adaptive complexity video decoder comprises statistics of decoding time required per frame.

13. The adaptive complexity video decoder of claim 8, wherein the parameter representing processing capability related to the adaptive complexity video decoder comprises processor-related information related to the adaptive complexity video decoder.

14. The adaptive complexity video decoder of claim 8, wherein the parameter representing processing capability related to the adaptive complexity video decoder comprises a temperature-related value related to adaptive complexity video decoder.

* * * * *

UNITED STATES PATENT AND TRADEMARK OFFICE
CERTIFICATE OF CORRECTION

PATENT NO. : 10,063,873 B2  
APPLICATION NO. : 14/856558  
DATED : August 28, 2018  
INVENTOR(S) : Fang-Yi Hsieh et al.

Page 1 of 1

It is certified that error appears in the above-identified patent and that said Letters Patent is hereby corrected as shown below:

On the Title Page

Page 2, item (63) change "Pat No. 9,259,808" to --Pat No. 8,259,808--.

Signed and Sealed this  
Twentieth Day of November, 2018

Andrei Iancu  
*Director of the United States Patent and Trademark Office*